United States Patent
Miranda et al.

(10) Patent No.: US 10,337,411 B2
(45) Date of Patent: Jul. 2, 2019

(54) AUTO THERMAL VALVE (ATV) FOR DUAL MODE PASSIVE COOLING FLOW MODULATION

(71) Applicant: General Electric Company, Schenectady, NY (US)

(72) Inventors: Carlos Miguel Miranda, Greer, SC (US); Kenneth Dale Moore, Greenville, SC (US)

(73) Assignee: General Electric Company, Schenectady, NY (US)

(*) Notice: Subject to any disclaimer, the term of this patent is extended or adjusted under 35 U.S.C. 154(b) by 539 days.

(21) Appl. No.: 14/983,768

(22) Filed: Dec. 30, 2015

(65) Prior Publication Data
US 2017/0191425 A1    Jul. 6, 2017

(51) Int. Cl.
| | |
|---|---|
| *F03G 7/06* | (2006.01) |
| *F01D 5/18* | (2006.01) |
| *F02C 9/18* | (2006.01) |
| *F01D 25/12* | (2006.01) |
| *F02C 7/18* | (2006.01) |
| *F01D 11/18* | (2006.01) |
| *F01D 11/24* | (2006.01) |

(52) U.S. Cl.
CPC .............. *F02C 9/18* (2013.01); *F01D 11/18* (2013.01); *F01D 11/24* (2013.01); *F01D 25/12* (2013.01); *F02C 7/18* (2013.01); *Y02T 50/675* (2013.01)

(58) Field of Classification Search
CPC ...................................................... F01D 11/18
See application file for complete search history.

(56) References Cited

U.S. PATENT DOCUMENTS

| | | |
|---|---|---|
| 799,256 A | 9/1905 | Parker |
| 2,659,198 A | 11/1953 | Cook |
| (Continued) | | |

FOREIGN PATENT DOCUMENTS

| | | |
|---|---|---|
| EP | 0391288 B1 | 5/1994 |
| EP | 1189805 A1 | 3/2002 |
| (Continued) | | |

OTHER PUBLICATIONS

Extended European Search Report and Opinion issued in connection with corresponding EP Application No. 16204159.4 dated Jul. 19, 2017

(Continued)

*Primary Examiner* — Kayla McCaffrey
(74) *Attorney, Agent, or Firm* — Ernest G. Cusick; Hoffman Warnick LLC (57) ABSTRACT

An auto thermal valve (ATV) for dual mode passive cooling flow modulation according to an embodiment includes: a gas flow inlet port; a gas flow outlet port; a temperature dependent expandable element; a rod coupled to the temperature expandable element; and a valve disc coupled to a distal end of the rod, the temperature dependent expandable element displacing the valve disc in response to a change in temperature; wherein the valve disc is displaced away from a valve seat by the temperature dependent expandable element at temperatures above and below a range of temperatures to allow a flow of cooling gas to pass from the gas flow inlet port to the gas flow outlet port.

16 Claims, 6 Drawing Sheets

(56) References Cited

U.S. PATENT DOCUMENTS

| | | | |
|---|---|---|---|
| 2,787,440 A * | 4/1957 | Thompson, Jr. | F01D 5/18 415/115 |
| 3,004,494 A | 10/1961 | Corbett | |
| 3,733,816 A | 5/1973 | Grennan et al. | |
| 3,851,998 A | 12/1974 | Downing | |
| 4,159,623 A | 7/1979 | McReynolds | |
| 4,255,927 A | 3/1981 | Johnson et al. | |
| 4,296,599 A | 10/1981 | Adamson | |
| 4,807,433 A | 2/1989 | Maclin et al. | |
| 5,022,817 A * | 6/1991 | O'Halloran | F01D 5/18 415/115 |
| 5,051,065 A | 9/1991 | Hansen | |
| 5,235,812 A | 8/1993 | Klaass et al. | |
| 5,279,109 A | 1/1994 | Liu et al. | |
| 5,349,812 A | 9/1994 | Taniguchi et al. | |
| 5,548,951 A | 8/1996 | Mumford et al. | |
| 5,557,920 A | 9/1996 | Kain | |
| 5,575,616 A | 11/1996 | Hagle et al. | |
| 5,716,423 A | 2/1998 | Krul et al. | |
| 5,737,922 A | 4/1998 | Schoenman et al. | |
| 5,820,589 A | 10/1998 | Torgerson et al. | |
| 5,924,276 A | 7/1999 | Mowill | |
| 5,988,589 A | 11/1999 | Mowill | |
| 6,016,824 A * | 1/2000 | Watanabe | F16K 31/025 137/1 |
| 6,021,979 A | 2/2000 | Bender et al. | |
| 6,022,197 A | 2/2000 | Cygnor et al. | |
| 6,050,079 A | 4/2000 | Durgin et al. | |
| 6,226,977 B1 | 5/2001 | Ichiryu et al. | |
| 6,237,323 B1 | 5/2001 | Ojiro et al. | |
| 6,250,066 B1 | 6/2001 | Lawrence et al. | |
| 6,327,845 B2 | 12/2001 | Ojiro et al. | |
| 6,390,733 B1 | 5/2002 | Burbage et al. | |
| 6,416,279 B1 | 7/2002 | Weigand et al. | |
| 6,449,956 B1 | 9/2002 | Kolman et al. | |
| 6,471,675 B1 | 10/2002 | Rogers | |
| 6,568,188 B2 | 5/2003 | Kolman et al. | |
| 6,589,205 B1 | 7/2003 | Meadows | |
| 6,595,098 B1 | 7/2003 | Wray | |
| 6,622,475 B2 | 9/2003 | Brault et al. | |
| 6,860,098 B2 | 3/2005 | Suenaga et al. | |
| 6,892,543 B2 | 5/2005 | Nakae | |
| 6,931,859 B2 | 8/2005 | Morgan et al. | |
| 6,979,315 B2 | 12/2005 | Rogers et al. | |
| 7,000,396 B1 | 2/2006 | Storey | |
| 7,200,986 B2 | 4/2007 | Sanders | |
| 7,299,618 B2 | 11/2007 | Terazaki et al. | |
| 7,340,880 B2 | 3/2008 | Magoshi et al. | |
| 7,445,424 B1 | 11/2008 | Ebert et al. | |
| 7,698,894 B2 | 4/2010 | Wood et al. | |
| 7,823,389 B2 | 11/2010 | Seltzer et al. | |
| 7,876,224 B2 | 1/2011 | Prokopuk | |
| 8,267,863 B2 | 9/2012 | Najafi et al. | |
| 8,275,533 B2 | 9/2012 | Davis, Jr. et al. | |
| 8,281,601 B2 | 10/2012 | McMahan et al. | |
| 8,307,662 B2 | 11/2012 | Turco | |
| 8,322,346 B2 | 12/2012 | Najafi et al. | |
| 8,549,864 B2 | 10/2013 | Langdon, II et al. | |
| 8,596,035 B2 | 12/2013 | Mowill | |
| 8,684,660 B2 | 4/2014 | Miranda et al. | |
| 8,966,877 B2 | 3/2015 | McKinney | |
| 9,028,206 B2 | 5/2015 | Liotta et al. | |
| 9,052,115 B2 | 6/2015 | Stoia et al. | |
| 9,097,084 B2 | 8/2015 | McDougall et al. | |
| 2002/0087120 A1 | 7/2002 | Rogers et al. | |
| 2002/0148216 A1 | 10/2002 | Brault et al. | |
| 2005/0159789 A1 | 7/2005 | Brockway et al. | |
| 2005/0187509 A1 | 8/2005 | Wolf | |
| 2006/0016195 A1 | 1/2006 | Dalla Betta et al. | |
| 2006/0042256 A1 | 3/2006 | Storey | |
| 2007/0074516 A1 | 4/2007 | Peck et al. | |
| 2007/0137213 A1 | 6/2007 | Rickert et al. | |
| 2007/0241931 A1 | 10/2007 | Compton et al. | |
| 2007/0266705 A1 | 11/2007 | Wood et al. | |
| 2008/0095652 A1 | 4/2008 | Jiang | |
| 2008/0112798 A1 | 5/2008 | Seitzer et al. | |
| 2008/0269573 A1 | 10/2008 | Najafi et al. | |
| 2009/0005656 A1 | 1/2009 | Najafi | |
| 2009/0148273 A1 | 6/2009 | Suciu et al. | |
| 2009/0243855 A1 | 10/2009 | Prokopuk | |
| 2010/0236249 A1 | 9/2010 | McMahan et al. | |
| 2011/0088405 A1 | 4/2011 | Turco | |
| 2011/0173984 A1 | 7/2011 | Valeev et al. | |
| 2011/0265486 A1 | 11/2011 | Plant | |
| 2012/0039702 A1 | 2/2012 | Sharp | |
| 2013/0000315 A1 | 1/2013 | Mowill | |
| 2013/0046152 A1 | 2/2013 | Najafi et al. | |
| 2013/0051976 A1 | 2/2013 | Kirtley | |
| 2013/0152582 A1 | 6/2013 | Anschel et al. | |
| 2013/0164157 A1 | 6/2013 | Roberts et al. | |
| 2013/0330168 A1 | 12/2013 | Liotta et al. | |
| 2014/0102544 A1 * | 4/2014 | Riley | B23P 19/00 137/13 |
| 2014/0127110 A1 | 5/2014 | Huckenbeck et al. | |
| 2014/0216051 A1 | 8/2014 | Johnson et al. | |
| 2014/0255145 A1 | 9/2014 | Miranda et al. | |
| 2015/0000939 A1 | 1/2015 | Willner | |
| 2015/0013345 A1 | 1/2015 | Porter et al. | |
| 2015/0377669 A1 | 12/2015 | DeSilva et al. | |
| 2017/0191372 A1 | 7/2017 | Tralshawala et al. | |

FOREIGN PATENT DOCUMENTS

| | | |
|---|---|---|
| EP | 1832751 A1 | 9/2007 |
| EP | 1770331 A3 | 9/2014 |
| GB | 2470253 A | 11/2010 |
| WO | 8602406 A1 | 4/1986 |
| WO | 9104395 A2 | 4/1991 |
| WO | 9727923 A1 | 8/1997 |
| WO | 2001002242 A1 | 1/2001 |
| WO | 2006060010 A1 | 6/2006 |
| WO | 2008127845 A1 | 10/2008 |
| WO | 2009006249 A1 | 1/2009 |
| WO | 2010072998 A1 | 7/2010 |
| WO | 2012030776 A2 | 1/2013 |
| WO | 2013001361 A2 | 1/2013 |
| WO | 2014099330 A1 | 6/2014 |
| WO | 2014178731 A2 | 11/2014 |
| WO | 2015176902 A1 | 11/2015 |

OTHER PUBLICATIONS

Raghavendra, R. A., et al., Ductile Braze Alloy Compositions and Related Methods and Articles, GE Co-Pending U.S. Appl. No. 60/402,547, filed Sep. 30, 2016.

U.S. Appl. No. 14/983,779, Office Action dated Mar. 15, 2018, 34 pages.

U.S. Appl. No. 14/983,774, Office Action dated Jul. 10, 2018, 46 pages.

* cited by examiner

AUTO THERMAL VALVE (ATV) FOR DUAL MODE PASSIVE COOLING FLOW MODULATION

CROSS-REFERENCE TO RELATED APPLICATIONS

This application is related to U.S. application Nos. 62/402,547 and Ser. No. 14/983,774, filed on Sep. 30, 2016 and Dec. 30, 2015.

BACKGROUND OF THE INVENTION

The disclosure relates generally to turbomachines, and more particularly, to an auto thermal valve (ATV) for dual mode passive cooling flow modulation.

Turbines are widely used in a variety of aviation, industrial, and power generation applications to perform work. Each turbine generally includes alternating stages of peripherally mounted stator vanes and rotating blades. The stator vanes may be attached to a stationary component such as a casing that surrounds the turbine, and the rotating blades may be attached to a rotor located along an axial centerline of the turbine. A compressed working fluid, such as steam, combustion gases, or air, flows along a gas path through the turbine to produce work. The stator vanes accelerate and direct the compressed working fluid onto a subsequent stage of rotating blades to impart motion to the rotating blades, thus turning the rotor and performing work. If any compressed working fluid moves radially outside of the desired flow path, the efficiency of the turbine may be reduced. As a result, the casing surrounding the turbine often includes a radially inner shell of shrouds, often formed in segments. The shrouds surround and define the outer perimeter of the hot gas path and may be located around both stator vanes and rotating blades.

Turbine shrouds and other turbine components (e.g., blades, nozzles, etc.) are typically cooled in some fashion to remove heat transferred by the hot gas path. A gas such as compressed air from an upstream compressor may be supplied through at least one cooling circuit including one or more cooling passages to cool the turbine shroud and other turbine components.

Tuning pins may be used to control the flow of cooling gas passing through the cooling passages. The flow of cooling gas may be controlled using the tuning pins according to the operational conditions of the turbine (e.g., a higher flow of cooling gas may be required on a hot day, while a lower flow of cooling gas may be required on a cool day). Such flow control may be provided by manuallyadjusting the tuning pins to regulate the flow of cooling gas as needed.

BRIEF DESCRIPTION OF THE INVENTION

A first aspect of the disclosure provides an auto thermal valve (ATV) for dual mode passive cooling flow modulation, including: a gas flow inlet port; a gas flow outlet port; a temperature dependent expandable element; a rod coupled to the temperature expandable element; and a valve disc coupled to a distal end of the rod, the temperature dependent expandable element displacing the valve disc in response to a change in temperature; wherein the valve disc is displaced away from a valve seat by the temperature dependent expandable element at temperatures above and below a range of temperatures to allow a flow of cooling gas to pass from the gas flow inlet port to the gas flow outlet port.

A second aspect of the disclosure provides cooling system for a turbine, including: a cooling circuit for cooling a component of the turbine; and an auto thermal valve for dual mode passive cooling flow modulation, the auto thermal valve comprising: a gas flow inlet port; a gas flow outlet port; a temperature dependent expandable element; a rod coupled to the temperature expandable element; and a valve disc coupled to a distal end of the rod, the temperature dependent expandable element displacing the valve disc in response to a change in temperature; wherein the valve disc is displaced away from a valve seat by the temperature dependent expandable element at temperatures above and below a range of temperatures to allow a flow of cooling gas to pass from the gas flow inlet port to the gas flow outlet port into the cooling circuit.

A third aspect of the disclosure provides an auto thermal valve system for dual mode passive cooling flow modulation in a turbine, including: a first auto thermal valve including: a gas flow inlet port; a gas flow outlet port; a temperature dependent expandable element; a rod coupled to the temperature expandable element; and a valve disc coupled to a distal end of the rod, the temperature dependent expandable element displacing the valve disc in response to a change in temperature; wherein the valve disc is displaced away from a valve seat by the temperature dependent expandable element at temperatures above a range of temperatures to allow a flow of cooling gas to pass from the gas flow inlet port to the gas flow outlet port; and a second auto thermal valve including: a gas flow inlet port; a gas flow outlet port; a temperature dependent expandable element; a rod coupled to the temperature expandable element of the second auto thermal valve; and a valve disc coupled to a distal end of the rod of the second auto thermal valve, the temperature dependent expandable element of the second auto thermal valve displacing the valve disc of the second auto thermal valve in response to a change in temperature; wherein the valve disc of the second auto thermal valve is displaced away from a valve seat of the second auto thermal valve by the temperature dependent expandable element of the second auto thermal valve at temperatures below the range of temperatures to allow a flow of cooling gas to pass from the gas flow inlet port of the second auto thermal valve to the gas flow outlet port of the second auto thermal valve.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

The disclosure relates generally to turbomachines, and more particularly, to an auto thermal valve (ATV) for dual mode passive cooling flow modulation.

Figures 1, 2:
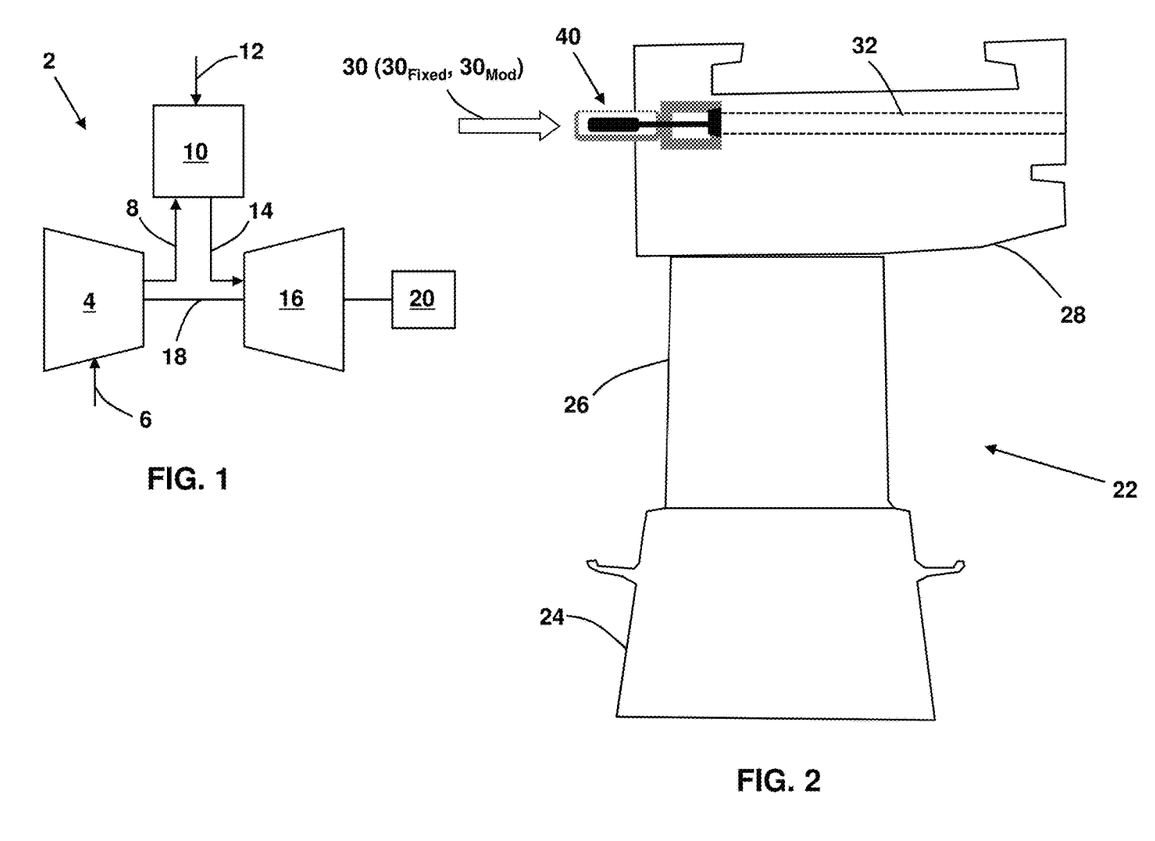
FIG. 1 is a schematic diagram of a gas turbine system, according to embodiments.
FIG. 2 depicts a turbine bucket and shroud, according to embodiments.

Referring now to the drawings, in which like numerals refer to like elements throughout the several views, FIG. 1 shows a schematic view of gas turbomachine 2 as may be used herein. The gas turbomachine 2 may include a compressor 4. The compressor 4 compresses an incoming flow of air 6. The compressor 4 delivers a flow of compressed air 8 to a combustor 10. The combustor 10 mixes the flow of compressed air 8 with a pressurized flow of fuel 12 and ignites the mixture to create a flow of combustion gases 14. Although only a single combustor 10 is shown, the gas turbine system 2 may include any number of combustors 10. The flow of combustion gases 14 is in turn delivered to a turbine 16. The flow of combustion gases 14 drives the turbine 16 to produce mechanical work. The mechanical work produced in the turbine 16 drives the compressor 4 via a shaft 18, and may be used to drive an external load 20, such as an electrical generator and/or the like.

An example of a turbine bucket 22 of the turbine 16 (FIG. 1) is depicted in FIG. 2. The turbine bucket 22 includes a base 24 and a blade 26 coupled to and extending radially outward from the base 24. A shroud 28 is positioned adjacent the blade 26 to limit the flow of combustion gas bypassing the turbine bucket 22 and not producing any useful work. The shroud 28 may be attached to a casing (not shown).

The shroud 28, blade 26, and/or other turbine components within the hot gas path may be cooled using a flow of cooling gas 30 (air). The flow of cooling gas 30 may be supplied by the compressor 4 of the gas turbomachine 2 and may be provided to/into the shroud 28, blade 26, and/or other turbine components via a set of cooling passages. One such cooling passage 32 in the shroud 28 is depicted in FIG. 2.

According to embodiments, the flow of cooling gas 30 into/through various components of the turbine 16 may be controlled using a set (i.e., one or more) of auto thermal valves (ATV) 40, which provide passive cooling flow modulation. The ATVs 40 may be used, for example, to provide passive flow modulation for hot day wheelspace (WS) and metal temperature control and for cold day backflow margin (BFM) flow control. The ATVs 40 eliminate the need for the above-described tuning pins, which are not capable of providing such passive flow modulation. Although only one ATV 40 is depicted in FIG. 2, any number of ATVs 40 may be used to control the flow of cooling gas in the turbine 16. The passive flow modulation provided by the ATV 40 provides cooling flow savings across the operating range of the turbine 16 and improves the output and efficiency of the turbine 16. Further, unlike tuning pins, the ATV 40 does not require manual field tuning for different operational conditions, thereby reducing operating costs.

Figure 3:
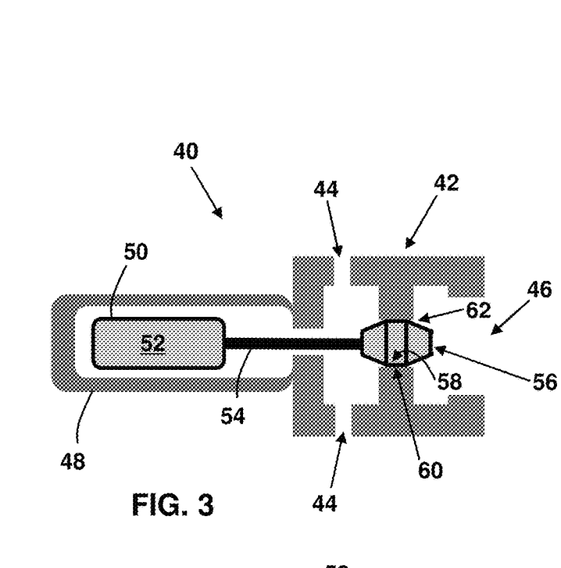
FIG. 3 depicts an auto thermal valve (ATV) in a closed configuration, according to embodiments.
Figure 4:
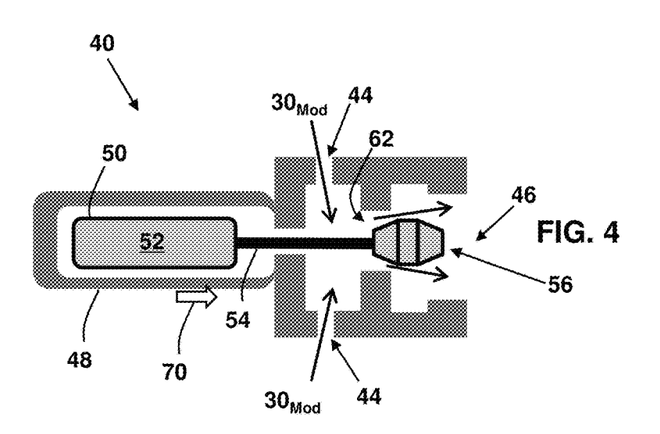
FIG. 4 depicts the ATV of FIG. 3 in a hot ambient modulated flow configuration, according to embodiments.
Figure 5:
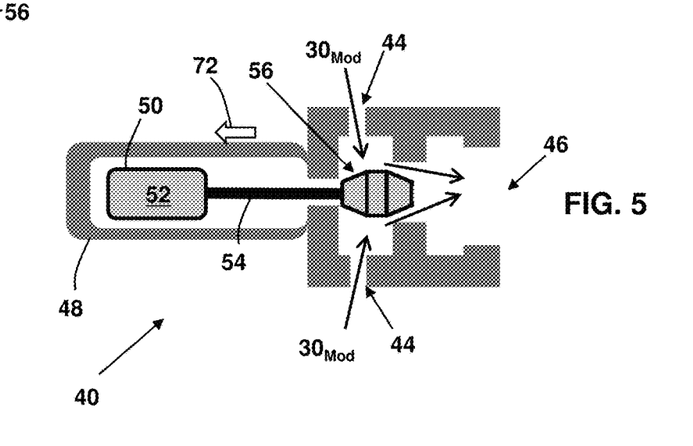
FIG. 5 depicts the ATV of FIG. 3 in a cold ambient modulated flow configuration, according to embodiments.

An ATV 40 for providing dual mode passive cooling flow modulation is depicted in FIGS. 3-5. As shown, the ATV 40 includes a valve section 42 including one or more gas flow inlet ports 44 and a gas flow outlet port 46. The ATV 40 further includes a housing 48 enclosing a bellows or other expandable element 50 containing a thermally expandable material 52. The thermally expandable material 52 may include, for example, a silicon heat transfer fluid. Any other suitable thermally expandable material 52 that is stable at the operating temperatures of the turbine 16 (e.g., up to 1300° F.) may also be used.

Figure 6:
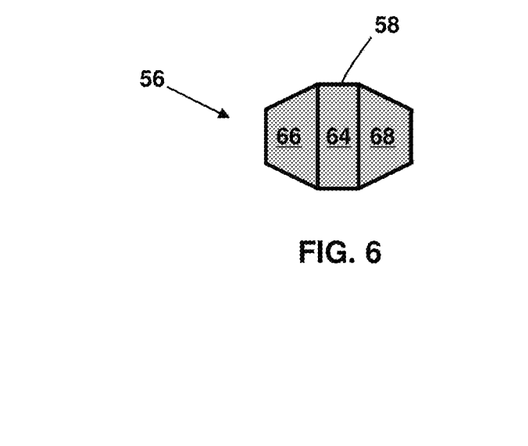
FIG. 6 depicts a valve disc, according to embodiments.

The expandable element 50 is coupled to a rod 54. A valve disc 56 is provided at a distal end of the rod 54. As depicted in FIG. 6, the valve disc 56 may include, for example, a central cylindrical section 64 including an outer surface 58, and opposing frusto-conical end sections 66, 68. Other suitable configurations of the valve disc 56 capable of providing the functionality described herein may also be used.

Generally, although not required, a fixed portion $30_{Fixed}$ (FIG. 2) of the flow of cooling gas 30 may be provided to the downstream cooling passage 32 (FIG. 1) for cooling purposes. An additional modulated portion $30_{Mod}$ (FIG. 2) of the flow of cooling gas 30 may be selectively provided to the downstream cooling passage 32 via the ATV 40, depending on ambient temperature and/or other factors.

The ATV 40 is shown in a closed configuration in FIG. 3. That is, in the closed configuration, at least a portion of the outer surface 58 of the valve disc 56 engages at least a portion of the valve seat 60. In the closed configuration, the flow of cooling gas $30_{Mod}$ is prevented from flowing from the gas flow inlet ports 44 through a valve seat opening 62 and the gas flow outlet port 46 into the downstream cooling passage 32.

Figure 7:
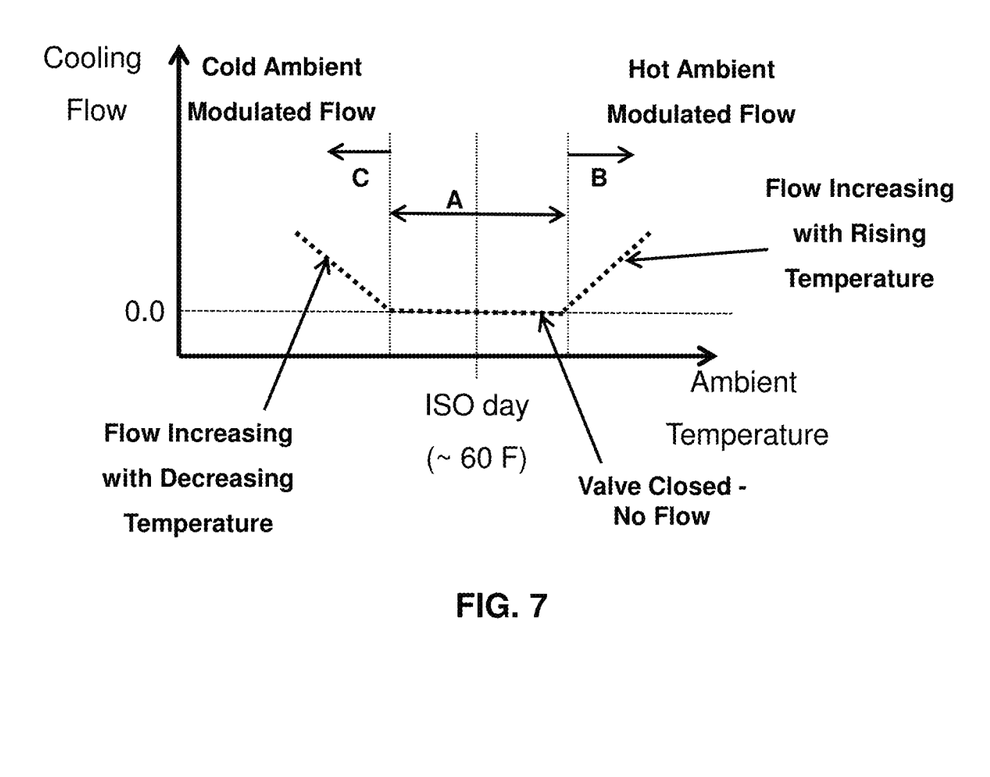
FIG. 7 is a chart illustrating temperature-based modulation of a flow of cooling gas, according to embodiments.

Referring temporarily to FIG. 7, there is shown a chart illustrating temperature-based modulation of the flow of cooling gas $30_{Mod}$ through an ATV 40, according to embodiments. As stated above, the flow of cooling gas $30_{Mod}$ through the ATV 40 may be in addition to a fixed flow of cooling gas $30_{Fixed}$. Section A of the chart, in which there is no flow of cooling gas $30_{Mod}$ through the ATV 40, corresponds to the ATV 40 in a closed configuration for a first range of temperatures (e.g., as shown in FIG. 3).

Referring now to FIG. 4, an increase in temperature at the ATV 40 causes an enlargement of the thermally expandable material 52 within the expandable element 50. This causes the expandable element 50 to extend within the housing 48 as indicated by arrow 70, forcing the rod 54 and valve disc 56 laterally away from the valve seat 60 towards the gas flow outlet port 46. When the outer surface 58 of the central cylindrical section 64 of the valve disc 56 no longer contacts the valve seat 60, a flow of cooling gas $30_{Mod}$ begins to flow from the gas flow inlet ports 44 through the valve seat opening 62 and the gas flow outlet port 46 into the downstream cooling passage 32 (FIG. 2). The flow of cooling gas $30_{Mod}$ increases as the valve disc 56 moves farther away from the valve seat 60 (as the temperature further increases) as more flow area is provided between the frusto-conical end section 66 of the valve disc 56 and the valve seat 60. Section B of the chart in FIG. 7 depicts the increase in the flow of cooling gas $30_{Mod}$ through the ATV 40 for a second, higher range of temperatures.

As depicted in FIG. 5, a decrease in temperature causes a contraction of the thermally expandable material 50 within the expandable element 50. This causes the expandable element 50 to contract within the housing 48 as indicated by arrow 72, forcing the rod 54 and valve disc 56 laterally away from the valve seat 60 and the gas flow outlet port 46. When the outer surface 58 of the central cylindrical section 64 of the valve disc 56 no longer contacts the valve seat 60, a flow of cooling gas $30_{Mod}$ begins to flow from the gas flow inlet ports 44 through the valve seat opening 62 and the gas flow outlet port 46 into the downstream cooling passage 32 (FIG. 2). The flow of cooling gas $30_{Mod}$ increases as the valve disc 56 moves farther away from the valve seat 60 (as the temperature further decreases) as more flow area is provided between the frusto-conical end section 68 of the valve disc 56 and the valve seat 60. Section C of the chart in FIG. 7 depicts the increase in the flow of cooling gas $30_{Mod}$ through the ATV 40 for a third, lower range of temperatures.

As depicted in FIGS. 3-5, the ATV 40 provides a flow of cooling gas $30_{Mod}$ in response to the temperature dependent displacement of the valve disc 56. The configuration of the valve disc 56 allows the cooling gas $30_{Mod}$ to flow through the ATV 40 to serve both functions of controlling BFM (cold day) and controlling WS temperatures (hot day), thereby providing dual mode functionality.

As detailed below, according to embodiments, a similar functionality may be provided using two individual ATVs in parallel, where one of the ATVs (e.g., ATV 140A, FIG. 8) is configured to displace a valve disc to an open position at high temperatures (and which is closed at low temperatures), while the second ATV (e.g., ATV 140B, FIG. 8) is configured to displace a valve disc to an open condition at low temperatures (and which is closed at high temperatures). The passive flow modulation provided by the ATVs 140A, 140B provides cooling flow savings across the operating range of the turbine 16 and improves the output and efficiency of the turbine 16. Further, unlike tuning pins, the ATVs 140A, 140B do not require manual field tuning, thereby reducing operating costs.

Figure 9:
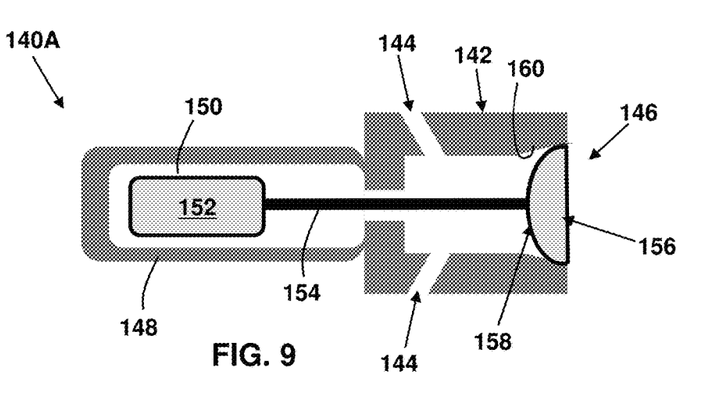
FIG. 9 depicts an ATV in a closed configuration, according to embodiments.
Figure 10:
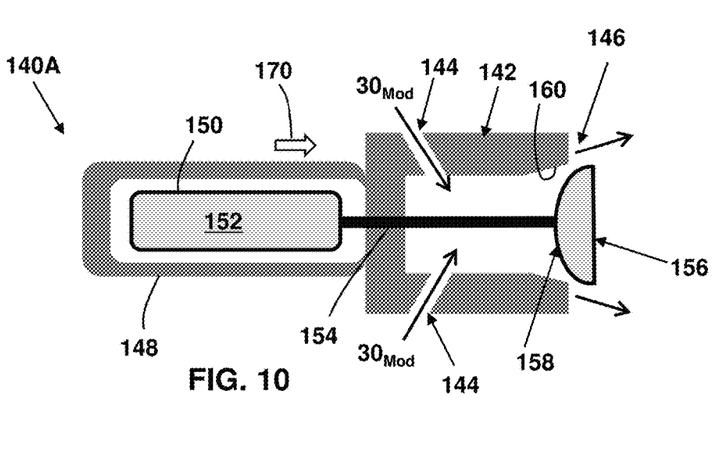
FIG. 10 depicts the ATV of FIG. 9 in an open configuration, according to embodiments.

The ATV 140A is depicted in a closed configuration in FIG. 9 and in an open configuration in FIG. 10. The ATV 140A includes a valve section 142 including one or more gas flow inlet ports 144 and a gas flow outlet port 146. The ATV 140A further includes a housing 148 enclosing a bellows or other expandable element 150 containing a thermally expandable material 152. The thermally expandable material 152 may include, for example, a silicon heat transfer fluid. Any other suitable thermally expandable material 152 that is stable at the operating temperatures of the turbine 16 (e.g., up to 1300° F.) may also be used.

The expandable element 150 is coupled to a rod 154. A valve disc 156 is provided at a distal end of the rod 154. As depicted in FIG. 9, the valve disc 156 may have an inwardly directed arcuate surface 158. Other suitable configurations of the valve disc 156 capable of providing the functionality described herein may also be used.

Figure 8:
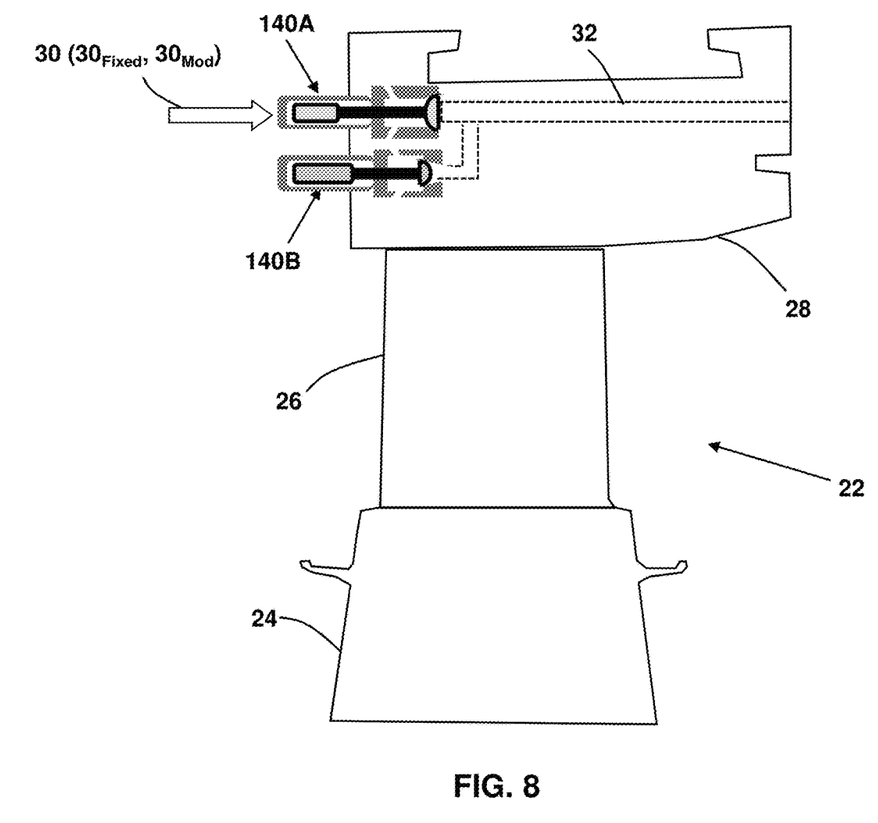
FIG. 8 depicts a turbine bucket and shroud, according to embodiments.
Figure 11:
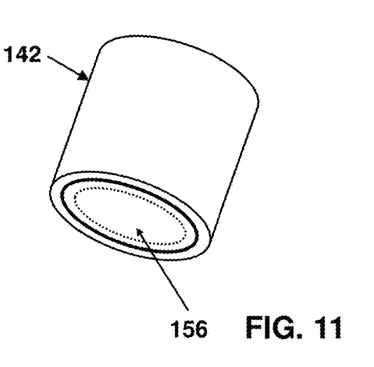
FIG. 11 is an end view of the ATV of FIG. 9, according to embodiments.

The ATV 140A is shown in a closed configuration in FIGS. 9 and 11. In the closed configuration, the arcuate surface 158 of the valve disc 156 sealingly engages a corresponding circular valve seat 160 formed adjacent the gas flow outlet port 146. In general, the valve disc 156 and valve seat 160 may have any suitable configuration capable of forming a seal to prevent the flow of gas through the gas flow outlet port 146. In the closed configuration, the flow of cooling gas $30_{Mod}$ is prevented from flowing from the gas flow inlet ports 144 through the gas flow outlet port 146 into the downstream cooling passage 32 (FIG. 8).

Figure 12:
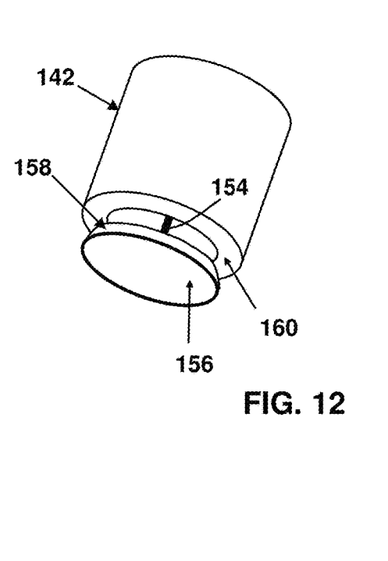
FIG. 12 is an end view of the ATV of FIG. 9 in an open configuration, according to embodiments.

Referring now to FIGS. 10 and 12, an increase in temperature at the ATV 140A causes an enlargement of the thermally expandable material 152 within the expandable element 150. This causes the expandable element 150 to extend within the housing 148 as indicated by arrow 170, forcing the rod 154 and valve disc 156 laterally away from the valve seat 160 and the gas flow outlet port 146. When the arcuate surface 158 of the valve disc 156 no longer forms a seal against the valve seat 160, a flow of cooling gas $30_{Mod}$ flows from the gas flow inlet ports 144 through the gas flow outlet port 146 and into the downstream cooling passage 32 (FIG. 8). The flow of cooling gas $30_{Mod}$ increases as the valve disc 156 moves farther away from the valve seat 160 (e.g., in response to a further increase in temperature) as more flow area is provided between the arcuate surface 158 of the valve disc 156 and the valve seat 160.

Figure 13:
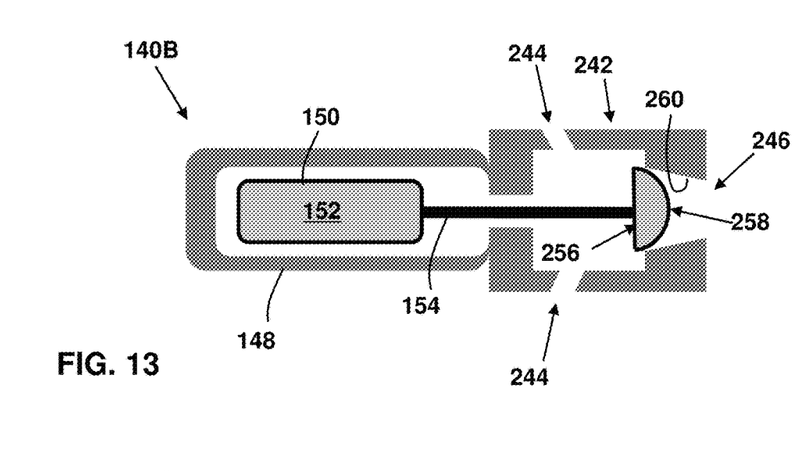
FIG. 13 depicts an ATV in a closed configuration, according to embodiments.
Figure 14:
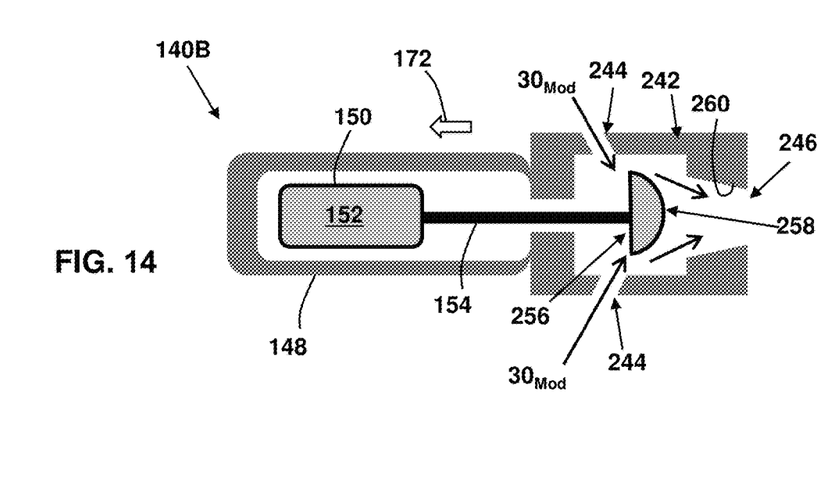
FIG. 14 depicts the ATV of FIG. 13 in an open configuration, according to embodiments.

The ATV 140B is depicted in a closed configuration in FIG. 13 and in an open configuration in FIG. 14. The ATV 140B includes a valve section 242 including one or more gas flow inlet ports 244 and a gas flow outlet port 246. The ATV 140B further includes a housing 148 enclosing a bellows or other expandable element 150 containing a thermally expandable material 152. The thermally expandable material 152 may include, for example, a silicon heat transfer fluid. Any other suitable thermally expandable material 152 that is stable at the operating temperatures of the turbine 16 (e.g., up to 1300° F.) may also be used.

The expandable element 150 is coupled to a rod 154. A valve disc 256 is provided at a distal end of the rod 154. As depicted in FIG. 13, the valve disc 256 may have an outwardly directed arcuate surface 258. Other suitable configurations of the valve disc 256 capable of providing the functionality described herein may also be used.

The ATV 140B is shown in a closed configuration in FIG. 13. In the closed configuration, the arcuate surface 258 of the valve disc 256 sealingly engages a corresponding circular valve seat 260 formed adjacent the gas flow outlet port 246. In general, the valve disc 256 and valve seat 260 may have any suitable configuration capable of forming a seal to prevent the flow of gas through the gas flow outlet port 246. In the closed configuration, the flow of cooling gas $30_{Mod}$ is prevented from flowing from the gas flow inlet ports 244 through the gas flow outlet port 246 into the downstream cooling passage 32 (FIG. 8).

Referring now to FIG. 14, a decrease in temperature at the ATV 140B causes a contraction of the thermally expandable material 152 within the expandable element 150. This causes the expandable element 150 to contract within the housing 148 as indicated by arrow 172, forcing the rod 154 and valve disc 156 laterally away from the valve seat 260 and the gas flow outlet port 246. When the arcuate surface 258 of the valve disc 256 no longer forms a seal against the valve seat 260, a flow of cooling gas $30_{Mod}$ flows from the gas flow inlet ports 244 through the gas flow outlet port 246 and into the downstream cooling passage 32 (FIG. 8). The flow of cooling gas $30_{Mod}$ increases as the valve disc 256 moves farther away from the valve seat 260 (e.g., in response to a further decrease in temperature) as more flow area is provided between the arcuate surface 258 of the valve disc 256 and the valve seat 260.

According to embodiments, a passive auto pressure valve (APV) may be used in lieu of or in combination with the ATV valves 40, 140 described above. Such an APV is actuated by changes in pressure, rather than by changes in temperature.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An auto thermal valve for dual mode passive cooling flow modulation, comprising:
    a gas flow inlet port;
    a gas flow outlet port;
    a temperature dependent expandable element;
    a rod coupled to the temperature dependent expandable element; and
    a valve disc coupled to a distal end of the rod, the temperature dependent expandable element displacing the valve disc in response to a change in temperature;
    wherein the valve disc is displaced away from a valve seat by the temperature dependent expandable element at temperatures above and below a range of temperatures to allow a flow of cooling gas to pass from the gas flow inlet port to the gas flow outlet port, and wherein the valve disc engages the valve seat to block the flow of cooling gas from flowing from the gas flow inlet port to the gas flow outlet port at temperatures within the range of temperatures.

2. The auto thermal valve according to claim 1, wherein the flow of cooling gas passing from the gas flow inlet port to the gas flow outlet port increases as the temperature moves away from the range of temperatures.

3. The auto thermal valve according to claim 1, wherein the temperature dependent expandable element contains a thermally expandable material.

4. The auto thermal valve according to claim 3, wherein the thermally expandable material comprises a silicon heat transfer fluid.

5. The auto thermal valve according to claim 1, wherein the temperature dependent expandable element comprises a bellows.

6. The auto thermal valve according to claim 1, wherein the valve disc comprises a central cylindrical section and opposing frusto-conical end sections.

7. A cooling system for a turbine, comprising:
    a cooling circuit for cooling at least one component of the turbine; and
    an auto thermal valve for dual mode passive cooling flow modulation, the auto thermal valve comprising:
        a gas flow inlet port;
        a gas flow outlet port;
        a temperature dependent expandable element;
        a rod coupled to the temperature dependent expandable element; and
        a valve disc coupled to a distal end of the rod, the temperature dependent expandable element displacing the valve disc in response to a change in temperature;
        wherein the valve disc is displaced away from a valve seat by the temperature dependent expandable element at temperatures above and below a range of temperatures to allow a flow of cooling gas to pass from the gas flow inlet port to the gas flow outlet port into the cooling circuit, and wherein the valve disc engages the valve seat to block the flow of cooling gas from flowing from the gas flow inlet port to the gas flow outlet port at temperatures within the range of temperatures.

8. The cooling system according to claim 7, wherein the flow of cooling gas passing from the gas flow inlet port to the gas flow outlet port increases as the temperature moves away from the range of temperatures.

9. The cooling system according to claim 7, wherein the temperature dependent expandable element contains a thermally expandable material.

10. The cooling system according to claim 7, wherein the temperature dependent expandable element comprises a bellows.

11. The cooling system according to claim 7, wherein the valve disc comprises a central cylindrical section and opposing frusto-conical end sections.

12. An auto thermal valve system for dual mode passive cooling flow modulation in a turbine, comprising:
    a first auto thermal valve including:
        a gas flow inlet port;
        a gas flow outlet port;
        a temperature dependent expandable element;
        a rod coupled to the temperature dependent expandable element; and a valve disc coupled to a distal end of the rod, the temperature dependent expandable element displacing the valve disc in response to a change in temperature;

wherein the valve disc is displaced away from a valve seat by the temperature dependent expandable element at temperatures above a range of temperatures to allow a flow of cooling gas to pass from the gas flow inlet port to the gas flow outlet port; and a second auto thermal valve including:
    a gas flow inlet port;
    a gas flow outlet port;
    a temperature dependent expandable element;
    a rod coupled to the temperature dependent expandable element of the second auto thermal valve; and
    a valve disc coupled to a distal end of the rod of the second auto thermal valve, the temperature dependent expandable element of the second auto thermal valve displacing the valve disc of the second auto thermal valve in response to a change in temperature;

wherein the valve disc of the second auto thermal valve is displaced away from a valve seat of the second auto thermal valve by the temperature dependent expandable element of the second auto thermal valve at temperatures below the range of temperatures to allow a flow of cooling gas to pass from the gas flow inlet port of the second auto thermal valve to the gas flow outlet port of the second auto thermal valve, and wherein the valve disc of the first auto thermal valve engages the valve seat of the first auto thermal valve to block the flow of cooling gas from flowing from the gas flow inlet port of the first auto thermal valve to the gas flow outlet port of the first auto thermal valve at temperatures within the range of temperatures, and wherein the valve disc of the second auto thermal valve engages the valve seat of the second auto thermal valve to block the flow of cooling gas from flowing from the gas flow inlet port of the second auto thermal valve to the gas flow outlet port of the second auto thermal valve at temperatures within the range of temperatures.

13. The auto thermal valve system according to claim 12, wherein the flow of cooling gas passing from the gas flow inlet port of the first auto thermal valve to the gas flow outlet port of the first auto thermal valve increases as the temperature increases above the range of temperatures, and wherein the flow of cooling gas passing from the gas flow inlet port of the second auto thermal valve to the gas flow outlet port of the second auto thermal valve increases as the temperature decreases below the range of temperatures.

14. The auto thermal valve system according to claim 12, wherein the temperature dependent expandable element of at least one of the first auto thermal valve and the second auto thermal valve contains a thermally expandable material.

15. The auto thermal valve system according to claim 12, wherein the temperature dependent expandable element of at least one of the first auto thermal valve and the second auto thermal valve comprises a bellows.

16. The auto thermal valve system according to claim 12, wherein the first auto thermal valve and the second auto thermal valve are coupled to a cooling system of a turbine.

\* \* \* \* \*